United States Patent [19]

Johnson et al.

[11] 4,370,674
[45] Jan. 25, 1983

[54] STABILIZATION NETWORK FOR A CATHODE RAY TUBE

[75] Inventors: Fred D. Johnson, Evanston; Michael D. Flasza; Wayne E. Bretl, both of Schaumburg, all of Ill.

[73] Assignee: Zenith Radio Corporation, Glenview, Ill.

[21] Appl. No.: 239,969

[22] Filed: Mar. 3, 1981

[51] Int. Cl.³ .............................................. H04N 9/16
[52] U.S. Cl. ........................................ 358/74; 358/29; 358/243; 315/383
[58] Field of Search .................. 358/29, 74, 219, 243, 358/34, 168, 172; 315/383

[56] References Cited

U.S. PATENT DOCUMENTS

| | | | |
|---|---|---|---|
| 3,955,212 | 5/1976 | Engel et al. | 358/29 |
| 4,012,775 | 3/1977 | Smith | 358/29 |
| 4,070,691 | 1/1978 | Smith et al. | 358/29 |
| 4,197,557 | 4/1980 | Tuma et al. | 358/34 |
| 4,295,166 | 10/1981 | Shanley et al. | 358/243 |

*Primary Examiner*—Robert L. Richardson

[57] ABSTRACT

A stabilization network is disclosed which compensates for variable emission characteristics of a cathode in a television receiver's cathode ray tube. During the receiver's vertical interval, a variable gain video amplifier applies a black level D.C. voltage to the cathode. The resulting cathode current is sensed and compared to a low level reference current. If the cathode current does not equal the reference current, a control signal is applied to the amplifier. The amplifier responds to changing its D.C. output voltage until the cathode current is equal to the reference current. The amplifier also responds to the control signal by altering its gain so that, when a video signal is received, the cathode develops peak white currents of a given value in response to peak white portions of the video signal.

12 Claims, 6 Drawing Figures

TIMING GENERATOR

STABILIZATION NETWORK FOR A CATHODE RAY TUBE

BACKGROUND OF THE INVENTION

This invention is directed to an improved CRT (cathode ray tube) stabilization network for use in color television receivers.

Generally, color television receivers include a CRT which has three electron guns, each of which includes its own cathode. The cathode current of each gun is directed toward the screen of the CRT to develop the red, blue or green component of a video image.

To produce an image of the proper color, the cut-off points of the cathodes should track with one another. This is, a video signal which causes one of the guns to produce a black level current should cause corresponding black level currents to be developed in the other two electron guns. Similarly, a video signal which causes one electron gun to develop a peak white current should cause corresponding peak white currents to be developed in the other two guns.

Because of differences in their temperatures, their aging characteristics and other variables, the emission characteristics of cathodes tend not to track with one another. That is, a video signal which produces a given cathode current in one gun does not produce a corresponding cathode current in the other two guns. As a result, mis-coloration of the video image occurs unless precautions are taken to avoid such mis-tracking.

To overcome the problem of mistracking among cathodes, many television receivers include six manually adjustable potentiometers. Three of the potentiometers are used to adjust the bias which each video amplifier applies to the cathode of an electron gun and three more potentiometers adjust the gain of three video output amplifiers. Typically, these are factory and service adjustments which compensate for the different emission characteristics of the electron guns. Changes in the emission characteristics or improper setting of the potentiometers results in mis-coloration in the video image.

To reduce the number of potentiometers required for cathode tracking, U.S. Pat. No. 3,955,212 teaches that the D.C. output voltage and the gain of each video output amplifier can be simultaneously adjusted by using one potentiometer per output amplifier. Adjusting the D.C. output voltage of each video output amplifier sets the cut-off point of its associated cathode for proper black level operation. Adjusting the gain of each video output amplifier causes its associated cathode to produce proper white level current.

Although the technique disclosed immediately above works well, it is desirable to provide automatic tracking adjustments. This would eliminate the need for manual factory and/or service adjustments and continuously maintain proper cathode tracking.

One proposal for automatic tracking requires that the current of each cathode be sampled twice during the receiver's vertical interval. One sampling detects cathode current corresponding to black level and another sampling detects cathode current corresponding to white level. In response to the sampled currents, feedback signals are developed for use in driving the cathodes during the receiver's active scan time so that they track with one another. U.S. Pat. Nos. 4,070,691 and 4,012,775 are illustrative of this method of stabilizing cathode currents in a two step operation.

Although the two step type of automatic cathode adjustment may be useful, it introduces unwanted complexity into receiver design. Moreover, integration of the video output stages of the receiver necessarily becomes more difficult. Hence, automatic tracking or CRT stabilization networks have not been widely used in commercial television receivers.

OBJECTS OF THE INVENTION

It is a general object of the invention to provide an improved CRT stabilization network for a color television receiver.

It is a more specific object of the invention to provide a CRT stabilization network which automatically compensates for differences in emission characteristics of CRT cathodes and which employs a relatively simple, integratable design.

BRIEF DESCRIPTION OF THE FIGURES

The objects stated above and other objects of the invention are set forth more particularly in the following detailed description and the accompanying drawings, of which.

DESCRIPTION OF THE PREFERRED EMBODIMENT

Figure 1:
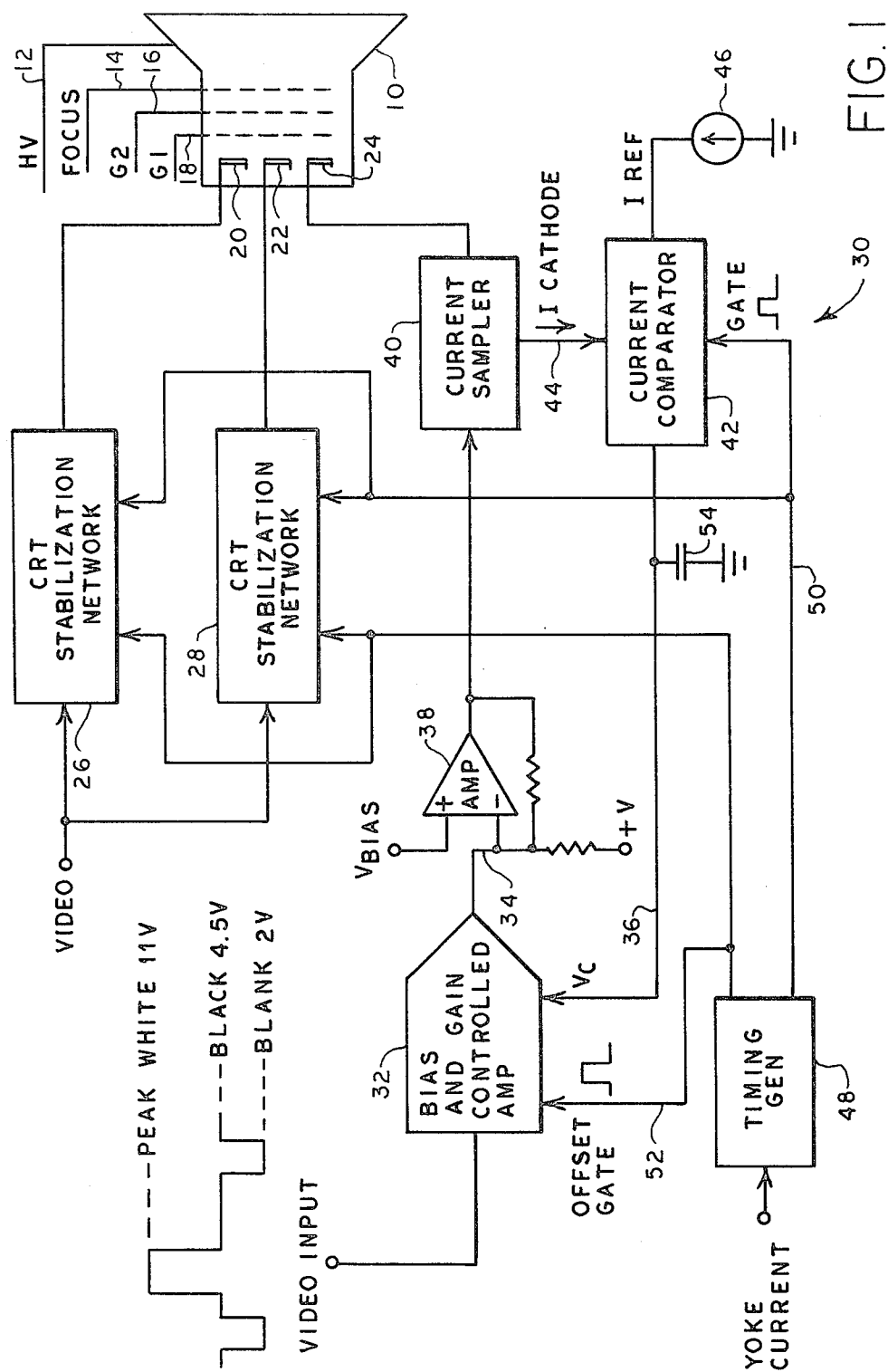
FIG. 1 shows three CRT stabilization networks according to the invention, one of which is shown in detail, for driving three cathodes of a cathode ray tube in a color television receiver.

Referring to FIG. 1, a CRT 10 is shown which receives high voltage via a lead 12 and a focus voltage via a lead 14. The G2 and G1 grids of the CRT receive their control voltages via leads 16 and 18, respectively. As shown, the single G1 grid for this particular CRT helps control the emission of all three cathodes simultaneously.

The three cathodes in the CRT are identified by the numerals 20, 22 and 24. As stated above, each of the cathodes tends to have a different cut-off point, where the cut-off point refers to the cathode voltage which inhibits a cathode from developing a current which produces visible light output on the CRT. If different cathodes have different cut-off points, they also require different drive voltages to produce similar peak white currents. This characteristic of cathodes is due to their current versus cut-off voltage relationship which is given by equation A below:

$$I = K(V_{co})^{\frac{3}{2}} \frac{(V_D)\gamma}{(V_{co})} \qquad \text{Eq. A}$$

In equation A, I represents cathode current, $V_{co}$ represents the cathode's cut-off voltage, K and $\gamma$ are constants, and $V_D$ represents the cathode's drive voltage, (the amplitude of the video signal applied to the cathode).

Coupled to the cathode 20 is a CRT stabilization network 26 which receives an input video signal. The network 26 adjusts its D.C. output voltage so that, irrespective of the cut-off point of the cathode 20, that cathode develops a current of a known low value in response to black level video. The network 26 also alters its gain so that, when the video signal includes peak white components, the cathode 20 develops peak white currents of a given level. Those peak white currents are held to a substantially constant value even as the cut-off point of the cathode 20 changes.

Another stabilization network 28 is coupled to the cathode 22 and receives the video signal. The network 28 operates in the same manner as the network 26 so that the cathodes 20 and 22 develop substantially the same low level currents in response to black level video, and the cathode 22 develops peak white currents of a selected value (which may differ from the peak white currents developed by the cathode 20) in response to peak white video signals. Thus, even though the emission characteristics of the cathodes 20 and 22 differ, they develop similar currents in response to black level video and peak white currents of a selected ratio in response to peak white portions of the video signal.

The cathode 24 is coupled to a stabilization network 30 which is similar to the networks 26 and 28. The network 30 causes the cathode 24 to develop the same low level current in response to black level video as is developed by the cathodes 20 and 22. The network 30 also causes the cathode 24 to develop a given peak white current in response to peak white portions of the video signal. This peak white current is selected to have a known ratio to the peak white currents of the cathodes 20 and 22. The various ratios of the peak white cathode currents are selected to provide a desired color temperature when a white video image is being produced.

Included in the network 30 is a bias and gain controlled amplifier 32 which receives a video signal at its input. As shown, the exemplary video signal has a peak white component of about 11 volts, a black level of about 4.5 volts and a blank level of about 2 volts. The amplifier 32 develops a D.C. bias and an amplified video signal at its output 34. As described in more detail below, the gain of the amplifier 32 and the value of its D.C. bias output are adjusted by a control signal Vc which appears on a lead 36.

The amplifier video signal and the D.C. bias on the lead 34 are received by a fixed gain amplifier 38. This amplifier may be a conventional high gain operational amplifier with negative feedback. In the case where it is desired to integrate the entire network 30 (along with networks 26 and 28), the amplifier 38 may be of the type disclosed in U.S. application Ser. No. 232,783, filed Feb. 9, 1981.

The output of the amplifier 38 is coupled via a current sampler 40 to the cathode 24. The sampler 40 does not modify the output of the amplifier 38. The signal which is applied to the cathode 24 is essentially that which is developed by the amplifier 32 and further amplified by the amplifier 38.

The function of the current sampler 40 is to direct cathode current to a current comparator 42 via a lead 44. Also coupled to the comparator 42 is a current source 46 which generates a reference current indicative of a desired black level cathode current. In the preferred embodiment, the current source 44 generates a reference current of about 10 microamps. The comparator 42, when enabled, compares the cathode current to the reference current and develops an output which is indicative of the difference, if any, between its inputs. The amplifier 32 responds to the output of the comparator 42 by adjusting its gain and D.C. output voltage so that the cathode 24 develops a current which is equal to the reference current during conditions of black level video, and so that the cathode 24 develops a given peak white current in response to peak white portions of the video signal. The networks 26 and 28 stabilize the currents in cathodes 20 and 22 in the same manner.

The current comparator 42 is enabled by a gate signal which is developed by a timing generator 48 and which is coupled to the comparator 42 via a lead 50. Preferably, the timing generator 48 receives the receiver's yoke current which deflects the cathode ray tube's beams vertically, and it generates the gate signal at that portion of the yoke current waveform which corresponds to the uppermost beam deflection. Thus, the comparator 42 is enabled during a portion of the receiver's vertical interval. Simultaneously, the generator 48 develops an offset gate which is applied to the amplifier 32 via a lead 52. The function of the offset gate is to simulate black level video at the output of the amplifier 32 so that the cathode current in the lead 44 is that current which is developed in response to black level video. The timing generator 48 applies similar offset gates and enabling signals to the stabilization networks 26 and 28.

In response to the enabling signal from the timing generator 48, the comparator 42 compares the value of the cathode current to the value of the reference current and charges a capacitor 54 with a control voltage Vc which is indicative of the difference between the reference current and the cathode current. The amplifier 32 responds to the signal Vc by altering its gain and its D.C. output bias for stabilizing the black level and white level cathode currents as previously described.

Figure 2:
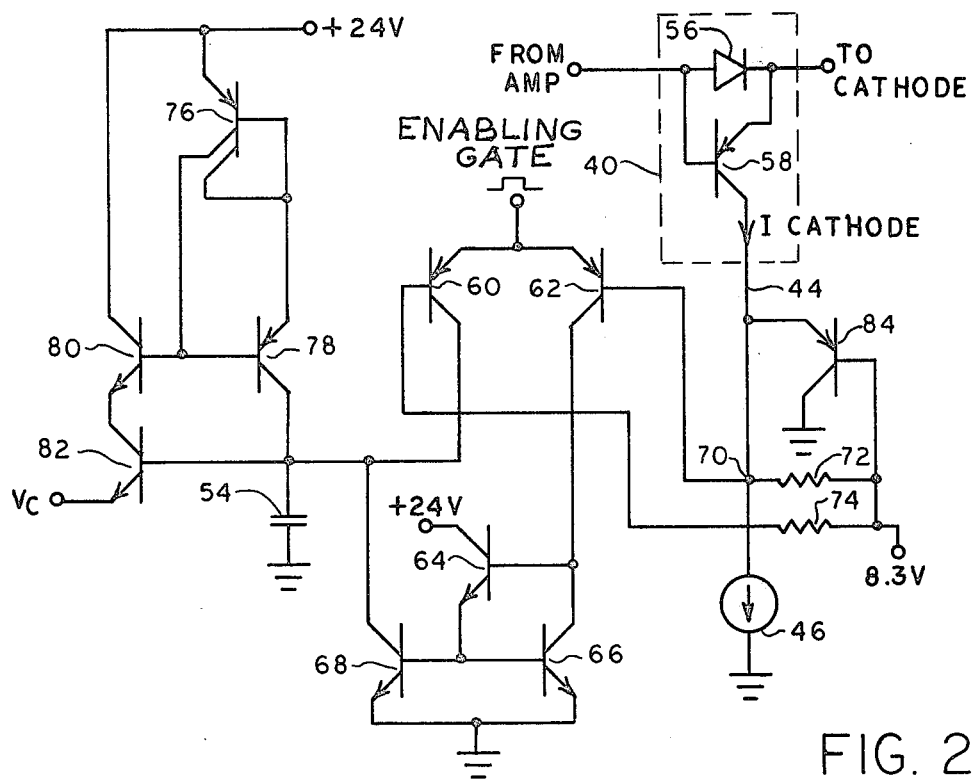
FIG. 2 is a detailed circuit diagram of the current comparator shown in FIG. 1.

Referring now to FIG. 2, a preferred embodiment of the current sampler 40 and the current comparator 42 are shown. The sampler 40 includes a diode 56 which couples the output of the amplifier 38 to the cathode 24. A transistor 58 has its emitter coupled to the cathode of the diode 56 and its base coupled to the diode's anode. With this arrangement, the current developed by the cathode 24 flows through the transistor 58 and into the lead 44 for application to the current comparator 42.

Included in the comparator 42 is a differential amplifier composed of emitter-coupled transistors 60 and 62. The emitters of transistors 60 and 62 receive the gate signal from the timing generator 48, while their collectors are coupled to a current mirror comprising transistors 64, 66 and 68. The latter transistors, together with transistor 60, charge and discharge the capacitor 54.

The base of the transistor 62 is coupled to a node 70 which receives the cathode current via the lead 44. The node 70 is also coupled to the current source 46 which may be conventional and which generates the black level reference current. A resistor 72 couples the node 70 to a bias voltage which, for this example, is shown to be 8.3 volts. The same bias voltage is coupled via another resistor 74 to the base of the transistor 60. With this arrangement, the voltage at the base of transistor 62 is equal to the voltage at the base of transistor 60 when the cathode current and the reference current are of equal value. If the cathode current is less than the reference current, the voltage at the base of transistor 62 is less than the voltage at the base of transistor 60. This causes the transistor 62 to conduct harder than the transistor 60 when the enabling gate signal is received from the timing generator 48. As a result, the capacitor 54 is discharged to a control signal voltage indicative of the difference between the reference current and the cathode current. When the cathode current exceeds the reference current, the transistor 60 conducts harder to charge the capacitor 54 to a voltage indicative of the difference between the cathode current and the reference current. Of course, when the enabling signal from the timing generator 48 is not present, the transistors 60 and 62 remain off so as not to disturb the previously established voltage on the capacitor 54. Thus, because the voltage on the capacitor 54 is changed only during the receiver's vertical interval, the value of the control signal remains substantially constant during the receiver's active scan time.

The voltage on the capacitor 54 is coupled to the amplifier 32 via a high input impedance buffer comprising transistors 76, 78, 80 and 82.

As shown, the lead 44 may be coupled to the emitter of a PNP type transistor 84 whose collector is grounded and whose base is coupled to the 8.3 volt bias. The function of the transistor 84 is merely to clamp the voltage at the node 70 to a maximum level.

Figure 3:
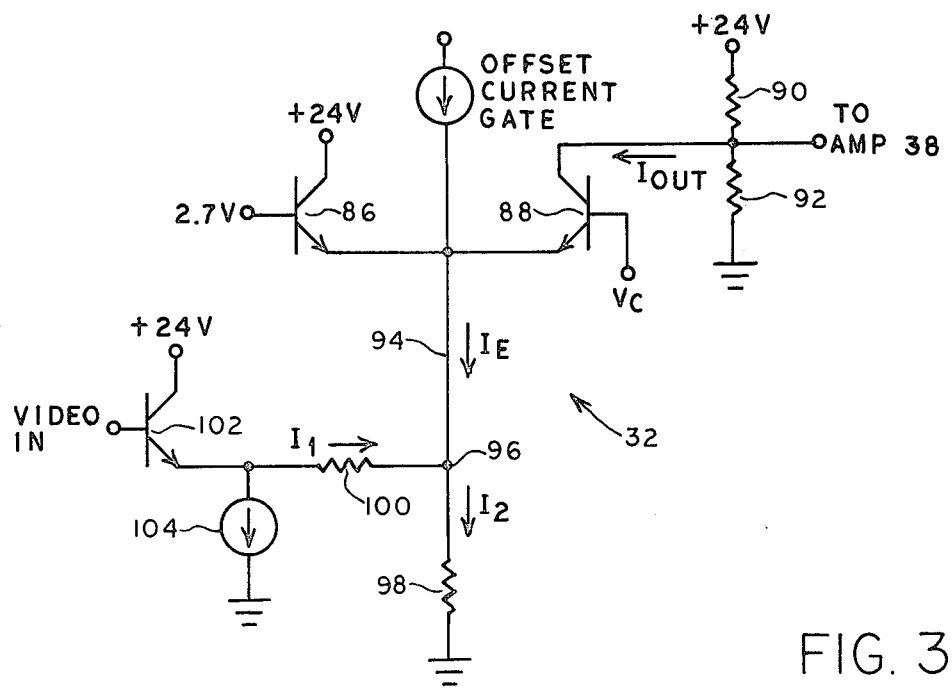
FIG. 3 is a detailed circuit diagram of the bias and gain controlled amplifier shown in FIG. 1.

Referring now to FIG. 3, a preferred embodiment of the gain controlled amplifier 32 is shown. The amplifier 32 includes a first transistor 86 whose base receives a constant bias voltage which, in this embodiment, is selected to be 2.7 volts. The collector of the transistor 86 is coupled to a positive voltage supply. A second transistor 88 has its emitter tied to the emitter of the transistor 86 to form a differential amplifier. The base of the transistor 88 receives the control signal Vc and the collector of the transistor 88 is tied to a load comprising resistors 90 and 92 which are coupled between the positive voltage supply and ground. The voltage developed by the collector current of the transistor 88 is coupled to the amplifier 38.

The emitters of transistors 86 and 88 are coupled via a lead 94 to a node 96 which connects to a grounded resistor 98. The node 96 is also coupled to another resistor 100 which is driven by an emitter follower transistor 102 which receives the video input signal at its base. A current source 104 is coupled to the emitter of the transistor 102 to establish a predetermined conduction level in that transistor.

With this arrangement, the current conducted by transistors 86 and 88 develops a current $I_E$ in the lead 94. A substantially constant current $I2$ flows in the resistor 98 because the node 96 is clamped to about two volts by the bias applied to the base of the transistor 86. In addition a current $I1$ flows through the resistor 100 in the direction indicated when the amplitude of the video signal exceeds about 2.7 volts. Thus, $I_E = I2 - I1$.

As the video signal amplitude changes, the current $I1$ changes accordingly. Because $I2$ is substantially constant, the current $I_E$ experiences the same change as the current $I1$.

Before describing how the current $I_E$ is handled by the transistors 86 and 88, it should be understood that the gain of the amplifier 32 can vary over a given range. Specifically, the amplifier's gain is selected to be variable over a range which holds the peak white cathode current to a substantially constant value as the amplifier's D.C. bias output changes to accommodate changes in the cathode's cut-off point. For example, where the cut-off point of the cathode is expected to vary from about 170 volts to 90 volts, the amplifier 32 is selected to be able to change its gain by about 25%. To achieve this gain range, the transistor 88 is selected to have an emitter area three times larger than the emitter area of the transistor 86 so that, when the transistors 86 and 88 have equal base to emitter voltages, the transistor 88 conducts three times as much current as the transistor 86.

Returning now to the current $I_E$, it is assumed that the control voltage Vc is initially equal to 2.7 volts. In that case, the transistors 86 and 88 develop a current $I_{out}$ in the collector of the transistor 88. Because the emitter area of the transistor 88 is three times larger than the emitter area of the transistor 86, a given change in $I_E$ results in $I_{out}$ experiencing 75% of that change.

When the control signal Vc is about 100 millivolts greater than 2.7 volts, the transistor 88 is fully on and the transistor 86 is turned off. In this condition, $I_{out}$ equals $I_E$. Hence, when the amplitude of $I1$ changes, $I_E$ and $I_{out}$ experience similar changes. Thus, the current $I_{out}$ undergoes a 25% increase in its rate of change in response to a change in $I_1$ as the control voltage increases from 2.7 volts to a higher value which is sufficient to turn off the transistor 86.

Thus, a change in the value of the control signal Vc changes the gain of the amplifier 32 and, therefore, the amplitude of the video signal which is applied to the cathode. In addition, as Vc increases, the D.C. voltage at the collector of transistor 88 tends to go negative. This results in an increase in the D.C. output voltage of the amplifier 38 (FIG. 1) for holding black level cathode current to the value of the reference current.

To set the black level cathode current to the value of the reference current, the video signal at the collector of transistor 88 is driven from blank level to black level during a sampling portion of the vertical interval. It is important, however, that the black level which is set at the collector of transistor 88 be equal to the actual black level which the video signal experiences during the receiver's active scan time. The absolute value of the latter black level may not be precisely known. In addition, it may vary. This is because the video signal is typically derived from a color demodulator whose average D.C. level may change with temperature and other variables. However, it is known that the video signal has a blank level during vertical retrace and that blank level differs from the video signal's black level by a known voltage difference. For example, the exemplary video signal shown in FIG. 1 has a blank level of 2 volts and a black level of 4.5 volts. Thus, the voltage difference between the video signal's blank and black levels is 2.5 volts, irrespective of the average D.C. value of the video signal. This 2.5 volt difference causes a known change in the current $I1$ as the video signal goes from blank level to black level. A corresponding change occurs in the current $I_E$ to drive the voltage at the collector of transistor 88 to black level.

To simulate the same black level at the collector of transistor 88 during the vertical interval, the timing generator 48 develops an offset current gate whose value is equal to the change in $I1$ which is experienced when the video signal goes from blank level to black level. For example, if a change of 300 microamperes in $I1$ results from the video signal going from blank level to black level, the offset current is selected to be 300 microamperes. Thus, the black level generated by the offset current is equal to the black level generated by the video signal. If the absolute value of the video signal's black level changes, the black level simulated by the offset current changes by the same amount. As a result, the value of the black level cathode current developed during the retrace interval is equal to the value of the black level cathode current which is developed in response to black level video which occurs subsequent to the vertical interval.

Figure 4:
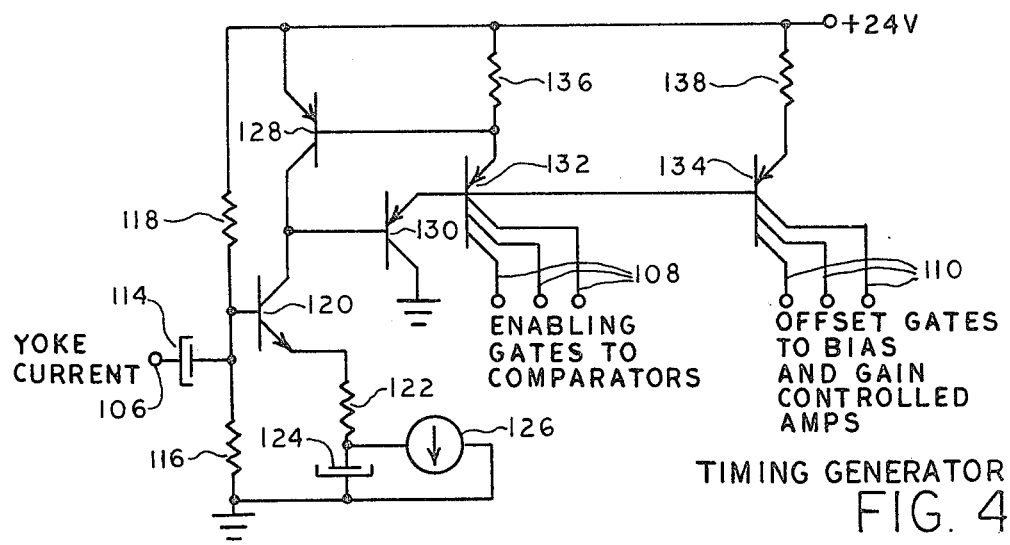
FIG. 4 is a detailed circuit diagram of the timing generator shown in FIG. 1.

Referring now to FIG. 4, a detailed circuit diagram is shown of the timing generator 48. This generator receives yoke current at an input terminal 106 for developing three simultaneous enabling gates at output leads 108 and three simultaneous current offset gates at leads 110. Each of the enabling gates developed at leads 108 is applied to one of the current comparators in the three stabilization networks. Each of the offset gates is applied to one of the bias and gain controlled amplifiers.

Figure 5:
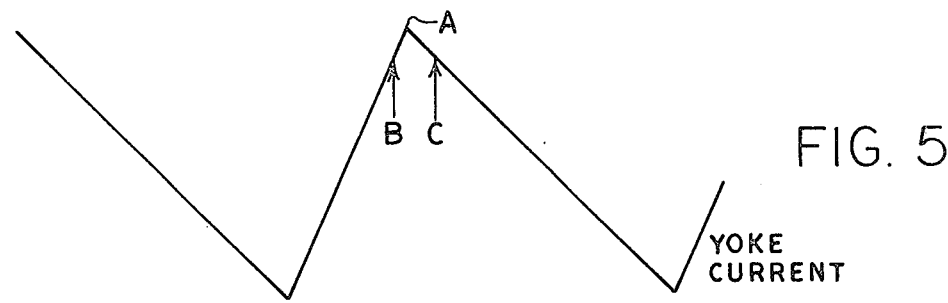
FIGS. 5 and 6 show waveforms useful in explaining the operation of the timing generator.
Figure 6:
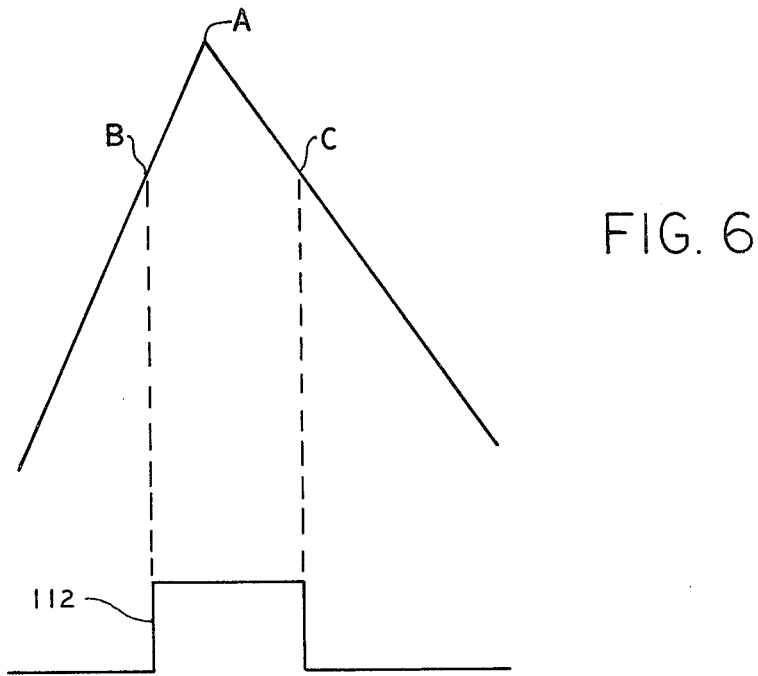

Referring briefly to FIG. 5, the ramp-shaped yoke current waveform is shown. Point A on this waveform corresponds to the time of uppermost beam deflection. Points B and C are about equally spaced from point A and occur during the receiver's vertical interval (as does point A). The timing generator differentiates the yoke current to narrow its peaks and to generate enabling gates and offset gates which occur between points B and C. FIG. 6 illustrates a portion of the differentiated yoke current and a current gate 112. The gate 112 represents one of the enabling gates as well as one of the offset gates developed by the timing generator.

Returning to FIG. 4, the yoke current is differentiated by coupling it through a capacitor 114 to the junction of a pair of resistors 116 and 118. The base of a transistor 120 is connected to the junction of resistors 116 and 118 and its emitter is coupled to ground through a resistor 122 and a capacitor 124. A current source 126 is included to discharge the capacitor 124 at a controlled rate.

The collector of transistor 120 is coupled to transistors 128, 130 and 132, the latter of which includes three collectors for developing three enabling gates. In parallel with the transistor 132 is another transistor 134 which also has three collectors for developing the three offset gates.

In operation, the yoke current input is differentiated by the capacitor 114 and the resistors 116 and 118. The transistor 120 conducts on the peaks of the yoke current to charge the capacitor 124 through the resistor 122. When the peaks of the yoke current are no longer present, the transistor 120 turns off and the source 126 slowly discharges the capacitor 124. Hence, the transistor 120 and the capacitor 124 operate much like a peak detector so that the transistor 120 conducts only on the peaks (between lines B and C in FIG. 6) of the yoke current.

Transistors 128 and 130 amplify the collector current of transistor 120 for driving the base of transistor 132. The current output of the latter transistor is controlled by the value of its emitter resistor 136.

The transistor 130 also drives the base of transistor 134. The current output of the latter transistor is controlled by the value of its emitter resistor 138. When the current I1 (FIG. 3) changes by 300 microamperes when the video signal goes from blank level to black level, the resistor 138 is selected such that the transistor 134 develops current offset gates of 300 microamperes each.

As described above, the three stabilization networks cause the three cathode currents to track with one another. Consequently, if the emission characteristics of one cathode should change, its stabilization network will automatically compensate for such a change.

Because the stabilization networks operate automatically, factory and service adjustments are eliminated. In addition, the preferred construction which is shown permits integration of the three stabilization networks on a single chip.

In the foregoing description, the amplifier 32 has been described in terms of setting a cathode operating condition in response to a black level video condition. The same amplifier construction may be used where it is desirable to set the cathode's operating condition in response to any other predetermined video signal level. For example, a peak white reference current may be compared to cathode current developed in response to a simulated peak white output from the amplifier. A control signal may be generated to control the gain of the amplifier so that known peak white cathode currents are developed. If desired, another such amplifier may be used to control the cathode's black level current to hold it to the value of a black level reference current.

Although the invention has been described in terms of preferred structure, it will be obvious to those skilled in the art that many alterations and modifications may be made without departing from the invention. Accordingly, it is intended that all such alterations and modifications be included within the spirit and scope of the invention as defined by the appended claims.

What is claimed is:

1. In a color television receiver which develops a video drive signal and which includes a cathode ray tube having at least one cathode, a stabilization network which compensates for variable emission characteristics of the cathode, comprising:

a variable gain amplifier receiving the video drive signal for driving the cathode with an amplified video signal and a D.C. bias, said amplifier being responsive to a variable control voltage for altering its gain and its D.C. bias output such that, for a given cathode current which is developed in response to the D.C. bias, a selected peak white cathode current is developed in response to peak white portions of the video signal;

means for generating a fixed reference current indicative of a desired black level cathode current;

a comparator receiving the cathode current and the reference current and responsive to an enabling signal for comparing the cathode current to the reference current and for generating a control signal indicative of the difference between the cathode current and the reference current;

means for coupling the control signal to the amplifier; and a timing generator for applying an enabling signal to the comparator and for simultaneously driving the video drive signal to black level during the receiver's vertical interval so that the control signal simultaneously alters both the gain and the D.C. bias output of the amplifier such that the cathode current is set to the reference black level current, and video drive signals received subsequent to the vertical interval are amplified so that their peak white portions develop given peak white cathode currents.

2. A stabilization network as set forth in claim 1 wherein the cathode has a current cut-off point which can vary, and wherein the gain of the amplifier is variable over a range which holds the peak white cathode current to a substantially constant value as the amplifier's bias output changes to accommodate changes in the cathode's cut-off point.

3. A stabilization network as set forth in claim 2 wherein the value of the control signal is variable between first and second values, and wherein the amplifier is adapted to have a given gain in response to the first value of the control signal and a substantially higher, maximum value in response to the second value of the control signal.

4. A stabilization network as set forth in claim 3 wherein the video signal received by the amplifier has a variable blank level which is offset from its black level by a known voltage difference, and wherein the timing generator offsets the output of the amplifier during the blank level by an amount corresponding to said voltage difference to achieve a black level output which corresponds to the black level of the video signal.

5. A stabilization network as set forth in claim 3 wherein said amplifier includes:
- a first transistor receiving a relatively fixed bias voltage at its base;
- a second transistor receiving the control signal at its base, having its emitter coupled to the emitter of said first transistor, having its collector coupled to a load, and having an emitter area which is a selected amount larger than the emitter area of the first transistor; and
- transistor means receiving the video signal and coupled to the emitters of the first and second transistors for modulating the collector current of the second transistor in accordance with amplitude variations in the video signal so that an amplified video signal is developed across the load, whereby the variation in gain exhibited by the amplifier is fixed by the ratios of the emitter areas of the first and second transistors.

6. A stabilization network as set forth in claim 5 wherein the ratio of the emitter area of said second transistor to the emitter area of said first transistor is selected to provide an available change in gain which compensates for changes in the cut-off point of the cathode.

7. A stabilization network as set forth in claim 6 wherein the emitter area of the second transistor is selected to be three times greater than the emitter area of the first transistor.

8. A stabilization network as set forth in claim 6 wherein the difference between the video signal's blank level and its black level results in a given difference in current being coupled to the emitters of the first and second transistors by said transistor means, and wherein the timing generator injects a current substantially equal to said current difference at the emitters of the first and second transistors during a selected portion of the video signal's blank level.

9. A stabilization network as set forth in claim 1 wherein the receiver includes means for generating a ramp-shaped yoke current for vertically deflecting the beam of the cathode ray tube, and wherein said timing generator receives the yoke current for generating an enable signal during that portion of the yoke current which corresponds to uppermost beam deflection.

10. In a color television receiver which develops a video signal and which includes a cathode ray tube having a plurality of cathodes, a stabilization network which compensates for variable emission characteristics of a cathode, comprising:
- means for generating a reference current indicative of a desired level of cathode current when the video signal is set at a predetermined level;
- means for sampling cathode current in response to an enabling signal, for comparing cathode current to the reference current, and for generating a control signal indicative of the difference between cathode current and the reference current;
- first and second emitter-coupled transistors, the base of the first transistor receiving a bias voltage, the base of the second transistor receiving the control signal, and the collector of the second transistor being coupled to a load across which an output signal is developed for application to the cathode;
- transistor means receiving the video signal and coupled to the emitters of the first and second transistors for modulating the collector current of the second transistor in response to amplitude variations in the video signal; and
- a timing generator for developing and applying an enable signal to said sampling means during the receiver's vertical interval and for simultaneously injecting current to the emitters of said first and second transistors to simulate a condition representing said predetermined level of the video signal so that the control signal alters the conduction of said second transistor and the cathode current is set to said reference current level.

11. A stabilization network as set forth in claim 10 wherein the emitter area of said second transistor is selected to be about three times larger than the emitter of said first transistor.

12. In a color television receiver which includes a cathode ray tube having three cathodes, which develops yoke current for vertically deflecting the beam of the cathode ray tube, and which develops a video signal having a blank level offset from its black level by a known voltage difference, a stabilization network which compensates for variable emission characteristics of a cathode, comprising:
- a variable gain amplifier receiving the video signal for driving the cathode with an amplified video signal and a D.C. bias, said amplifier being responsive to a variable control voltage for altering its gain and its D.C. bias output such that, for a given cathode current which is developed in response to the D.C. bias, a selected peak white cathode current is developed in response to peak white portions of the video signal;
- means for generating a reference current indicative of a desired black level cathode current;
- a comparator receiving the cathode current and the reference current and responsive to an enabling signal for comparing the cathode current to the reference current and for generating a control signal indicative of the difference between the cathode current and the reference current;
- means for coupling the control signal to the amplifier; and
- a timing generator receiving the yoke current for generating an enable signal during that portion of the yoke current which corresponds to uppermost beam deflection and for simultaneously offsetting the output of the amplifer by an amount corresponding to the voltage difference between the video signal's blank level and black level to simulate a black level output from said amplifier, whereby the control signal alters both the gain and the D.C. bias output of the amplifier such that the cathode current is set to the reference black level current, and video signals received subsequent to the vertical interval are amplified so that their peak white portions develop given peak white cathode currents.

* * * * *